United States Patent [19]

Vogl et al.

[11] Patent Number: 4,918,724
[45] Date of Patent: Apr. 17, 1990

[54] COIN FRAUD PREVENTING UNIT AND MODULAR CONFIGURATIONS FOR PAY TELEPHONE STATIONS

[75] Inventors: Allen W. Vogl, Melbourne; Steven C. Poe, West Melbourne; John H. MacNeill, Indialantic; Douglas J. Buron, Micco, all of Fla.

[73] Assignee: International Teleservice Corporation, Melbourne, Fla.

[21] Appl. No.: 407,947

[22] Filed: Sep. 15, 1989

[51] Int. Cl.[4] .................. H04M 1/15; H04M 17/02; H04M 1/08; G07F 3/02
[52] U.S. Cl. .................. 379/145; 379/424; 379/429; 379/438; 194/203
[58] Field of Search ........... 379/145, 422, 424, 429, 379/146, 150, 437, 438; 194/202, 203

[56] References Cited

U.S. PATENT DOCUMENTS

| | | | |
|---|---|---|---|
| 4,518,830 | 5/1985 | Drexler et al. | 379/438 |
| 4,542,817 | 9/1985 | Paulson | 194/203 X |
| 4,747,134 | 5/1988 | Holland et al. | 379/145 X |

Primary Examiner—Stafford D. Schreyer
Attorney, Agent, or Firm—Antonelli, Terry & Wands

[57] ABSTRACT

A pay telephone station having a lower housing coin chute (14) which is provided with a coin fraud prevention unit (10) in the form of a thin base (15) arranged in a slot (11) of a coin channel cover plate (12). The base (15) is provided with a pawl (23) having a tooth (24) with a chamfered face (25) which is biased into the path of a coin passing through a coin path (39) by a torsion spring (26). An anchor (59) for connecting a handset (56) to the upper housing coin dial unit (50) of the station includes a base with apertures (63, 64) and a V-shaped body (65) with a notch 66 defined between surfaces (69, 70). A long thumbscrew member (74) with a textured gripping surface connects the anchor (59) to a projector (51) integral with the upper housing (50). The handset cord assembly (A) is first passed through an aperture (54) in the projection (51) and then through the aperture (64) in the base (60). A button (68) firmly attached to a lanyard (67) in the armor (55) of the assembly (A) is held against the surfaces (69, 70) by the lanyard (67) and in the notch (66) by the thumbscrew (74) adjacent the button (68). A shorting connector (80) is provided for rapidly changing hook switch configurations in the upper housing coin dial unit (50). A configuration module (90) is used to rapidly and easily connect various circuits (93, 94, 95, 96, 97, 98, 99) on a printed circuit board (92) in the upper housing coin dial unit (50).

41 Claims, 8 Drawing Sheets

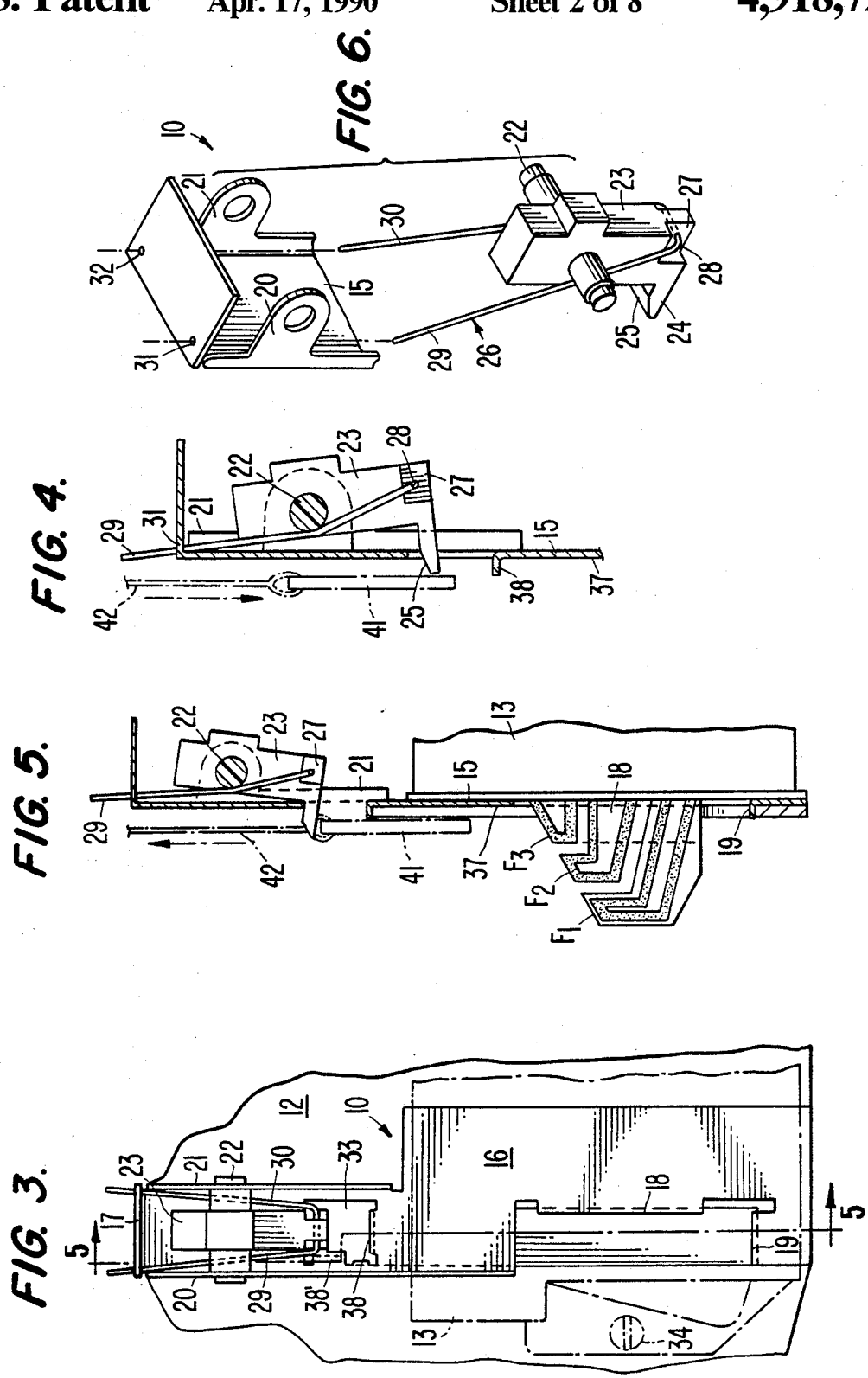

AT&T BLACK SLIDE TIMING

T-S BLACK SLIDE TIMING

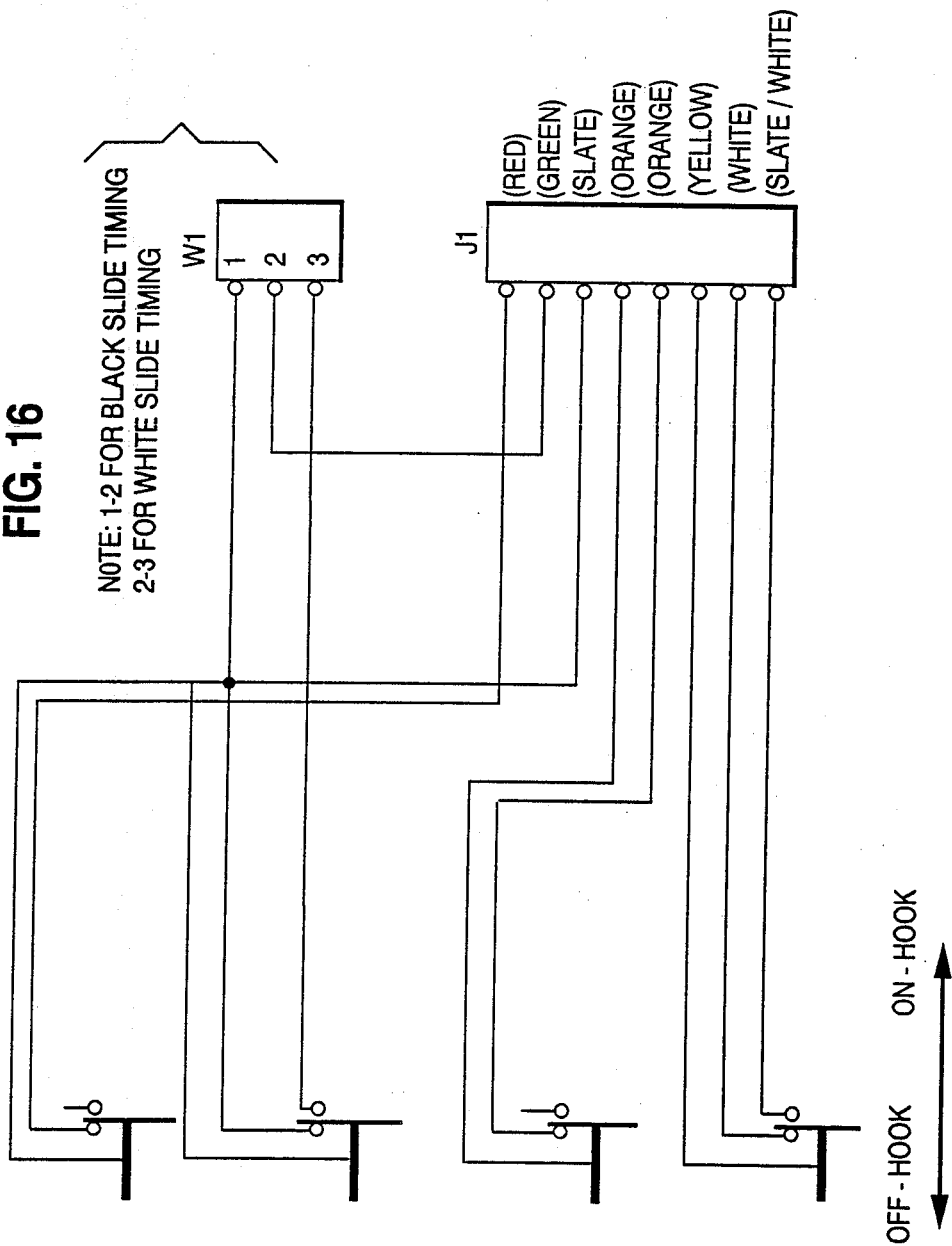

COIN FRAUD PREVENTING UNIT AND MODULAR CONFIGURATIONS FOR PAY TELEPHONE STATIONS

TECHNICAL FIELD

The present invention relates to improvements in a pay telephone station. More particularly, the present invention relates to an improved connection between the handset and the station housing, a simple and effective way to prevent coin fraud, a new way to obtain prewired configurations, and the use of modules to simplify wiring.

BACKGROUND ART

Pay telephone stations encounter a number of problems, from the point of view of abuse and vandalism by users and of difficulties in repairing and installing the pay telephone station. For example, a major problem which causes significant loss of revenues to the telephone company is the perpetration of coin fraud. The perpetrator usually attaches a thin strong thread or string to a coin and passes the coin into the coin slot to place a call. Typically for long distance calls or multiple local calls, several coins are required to pay the toll. Thus, when the perpetrator inserts the coin while holding the thread attached to the coin and dials, for example, the desired long distance number, the telephone company advises the caller that additional coins must be placed in the station. Instead of placing additional coins in the station the caller, having held onto the deposited coin by means of the thread which extends outside the station, simply oscillates the coin within the station the required number of times to trip the appropriate circuitry which registers and therefore counts the "coins". Numerous techniques have been proposed to prevent this type of coin fraud, but they are usually fairly complex, difficult to install or simply too expensive.

Another problem involves the handset into which the caller speaks and through which the caller hears the voice at the other end of the line. Even where vandalism does not occur, handsets incur substantial physical abuse in one form or another. Unfortunately, the handset is also subject to being pulled away from the telephone station housing whether intentionally or unintentionally. Substantial tensile forces are placed on the steel lanyard or inner cable connecting the handset to the station housing, and the connection between the two must be sufficient to prevent breakage and thereby avoid unnecessary repair. When the lanyard is broken, tensile force transferred to the flexible metal outer armor hose may unravel the same and expose sharp edges which can lead to physical harm to the user and liability to the phone company. Presently available connection systems are cumbersome to install and do not provide the requisite tensile strength needed to handle the great variety of situations which lead to the breakage of the connection between the handset and the station housing.

In terms of the configuration of the wire terminations and switches within the pay station itself, the stations currently used require time consuming connection of spaded wire terminals to screws. Given the number and variety of connections which must be made, the cost of labor involved in effecting these connections becomes inordinately high.

Pay telephone hook switch assemblies typically use a camming arrangement which is fixed to and rotated by a shaft actuated by rotation of the hook switch lever. One such arrangement uses snap-action switches which are opened and closed by two cams which differ from each other in curvature and configuration to open and close the switches in a predetermined sequence as shown in U.S. Pat. No. 4,747,134. It is currently necessary to utilize interchangeable slides or program cards to provide different timing configurations in a hook switch assembly which utilizes cam switches. This arrangement requires an inventory of slides and a time consuming operation in changing the slides when a different hook switch configuration is desired.

DISCLOSURE OF THE INVENTION

It is an object of the present invention to provide a pay station which overcomes the problems and disadvantages encountered in conventional pay telephone stations.

More particularly, it is an object of the present invention to provide a pay telephone station with a coin fraud prevention unit that is simple in construction and easily installed.

It is yet a further object of the present invention to provide a very strong connection between the handset lanyard and armor and the station housing which is simple in construction and extremely easy to install.

It is still a further object of the present invention to provide by means of a simple connector the ability to switch between different configurations in a hook switch assembly.

It is yet another object of the present invention to provide a modular arrangement of the various subassemblies and related interconnection points within the pay station that allows the use of a simple configuration module. This module easily installs into the pay station and makes the needed connections without requiring these interconnection points to be individually wired.

The foregoing objectives have been achieved by providing a coin fraud prevention device in the form of a spring-biased pawl which permits a coin to pass a tooth on the pawl but prevents the coin from being pulled back through the coin chute.

One feature of the present invention resides in an anchor comprising a base to which a V-shaped body is joined to provide for a secure holding of the handset lanyard and armor to the telephone station housing.

Another feature of the present invention is the use of a long thumbscrew which becomes an integral part of the anchor to secure the lanyard while, at the same time, allowing for installation without tools.

A further feature of the present invention involves the use of a shorting connection which changes the interconnection of wires in a switch assembly to provide the required varied hook switch configurations which allow the hook switch to function properly for various pay station configurations.

Yet another feature of the present invention resides in the use of a circuit board assembly which serves as a junction for all of the various interconnection points of the pay station. The connections are routed on this circuit board assembly to a single common connector. A configuration module mates to this common connector and provides the interconnections appropriate for the pay station.

BRIEF DESCRIPTION OF THE DRAWINGS

These and other features, objects and advantages of the present invention will become more apparent from the following description when taken in conjunction with the accompanying drawings which show a presently preferred embodiment of and best mode for carrying out the present invention and wherein:

FIG. 3 is a front elevational view of the coin fraud preventor unit of the present invention similar to that shown installed in the coin channel cover plate of FIG. 1;

FIG. 4 is a partial side elevational view of the coin fraud preventor of FIG. 3 showing how a coin is allowed to descend in the coin chute;

FIG. 5 is a cross-sectional full side elevational view of the coin fraud protector unit taken along line 5—5 of FIG. 3 showing how the unit functions to prevent the perpetration of a coin fraud;

FIG. 6 is a partial, exploded perspective view of the pawl, base and spring of the coin fraud protector unit of FIG. 3;

FIG. 16 is a schematic diagram of the hook switch circuit which utilizes the shorting jumper in accordance with the present invention as shown in FIGS. 7 and 8 and timing configurations for opening and closing switches shown in FIGS. 15B and 15D..

BEST MODE FOR CARRYING OUT THE INVENTION

Figure 2:
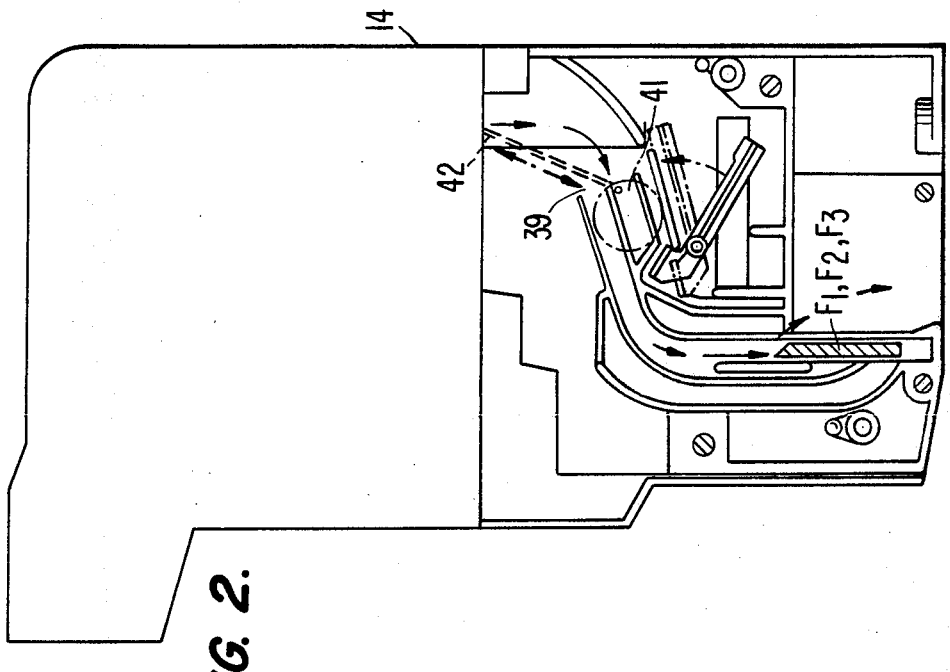
FIG. 2 is a side view similar to FIG. 1 with a coin channel cover plate removed to show an area in which a coin fraud is perpetrated in the absence of the present invention.

Referring now to the drawings and, in particular, to FIGS. 1 to 6, there is shown a coin fraud prevention unit designated generally by the numeral 10 which is mounted in a slot 11 provided in a coin channel cover plate 12 with an associated coin sensor signal unit 13 of known construction in a conventional pay telephone station coin chute assembly 14. The unit 10 shown in greater detail in FIGS. 3–6 comprises a thin base 15 made of sheet steel, molded plastic or other suitable material which extends in a generally longitudinal direction with a jog 16 at a central portion of the unit. Flanges 18, 19, 38 and 38' are provided at spaced locations on the unit 10 to allow the same to be quickly and easily located within the slot 11 when the unit 10 is installed on the coin channel cover plate 12 as hereinafter described.

At the upper end of the unit 10, two upstanding flanges 20, 21 are provided in which a shaft 22 carrying a pawl 23 is rotatably mounted. The lower end of the pawl 23 is provided with a tooth 24 having a chamfered face 25. A U-shaped torsion spring 26 is connected at a lower end 27 of the pawl 23. The end 27 has an undercut portion. The bight portion 28 of the spring 26 passes through the thinned or undercut lower end 27, while the legs 29, 30 of the U-shaped spring extend through two holes 31, 32 provided in the flange 17 extending orthogonally from the face of the unit 10 such that the pawl 23 will be biased in a clockwise direction, i.e. into the face of the unit through an aperture 33 in the body 15 of the unit 10, as viewed in FIGS. 4 and 5.

The coin fraud prevention unit 10 can be provided with double sided tape on the face 37 of the unit 10 adjacent the plate 12 to facilitate its attachment to the cover plate 12 of the coin chute assembly 14. Alternatively, other readily available, conventional fastening means can be used to assure a positive mounting of the unit 10 in the slot 11 of the coin channel cover plate 12 in a simple and quick manner. The installation and operation of the coin fraud preventor unit 10 will now be described.

As shown in FIG. 2 where the coin channel cover plate 12 has been removed and in the case where the coin fraud prevention unit 10 will not have been installed, it can be seen how coin fraud is perpetrated. Typically, the perpetrator will drill a small hole in a quarter 41 (shown in dot-dash lines) and attach a fine but sufficiently strong thread 42 to the coin 41. When placing a long-distance call requiring more than a one-coin toll or when placing multiple local calls, the perpetrator can pass the coin through the pay slot in the upper housing down into the chute assembly 14 while holding the string 42 outside the pay telephone station. The coin 41 is lowered until it strikes one of the coin detector fingers on the signal unit which is mounted through slot 11. A quarter strikes finger F3 of the signal unit 13 shown in FIG. 5, and the coin 41 then is pulled back slightly with the thread 42 instead of allowing the coin 41 to proceed downwardly by gravity in the coin path 39 in the direction of the arrows in FIG. 2. This pulling back and forth of the coin 41 can continue until the station circuitry registers that sufficient payment has been made for the call.

In a typical installation, an upper housing (not shown) is removed from the pay telephone station. In the lower housing (not shown), a known type of signal connector plug (not shown) is unplugged from the chassis, and the coin chute assembly 14 is removed from the lower housing. Mounting screws for holding the signal pad 13, having fingers $F_1$, $F_2$, $F_3$ (FIG. 5), onto the coin chute 14 assembly at locations 34, 35 are loosened so that the signal pad 13 can be removed and set aside. The slot 11 is already present in the coin channel cover plate 12 of the coin chute assembly 14 and is now completely accessible. In the situation where the coin fraud prevention unit 10 is provided with double sided tape, the unit 10 is first fitted into the slot 11 before removing the protective backing from the tape. The locating tabs or flanges 18, 19, 38 and 38' on the unit 10 will correctly position the unit 10 in the slot 11. The person making the installation will verify that the back 37 of the unit 10 is flush with the cover plate 12 and also that the pawl 23 which can be made of plastic or the like operates freely with no binding or sticking of the pawl tooth 24.

When the installer is satisfied that the unit 10 is working properly, the protective tape backing can be peeled off and the unit 10 inserted into the slot 11 on the coin channel cover plate 12 by locating the lowest tab 19 into the slot 11 first and then angling the unit 10 into place. Thereafter, the installer should firmly press the unit 10 on all surfaces and also again verify that the tooth 24 of the pawl 23 operates freely with no binding or sticking. Then the signal pad 13 can be reinstalled on the coin chute assembly 14, the coin chute assembly 14 installed into the lower housing, and the signal connector (not shown) plugged back into the chassis. Before reinstalling the upper housing, the completed installation can be tested by dropping several quarters through the coin chute 14 and observing the action of the pawl 23. In this connection, the tooth 24 of the pawl 23 should kick out or rotate counterclockwise as viewed in FIGS. 4 and 5 as the coins drop through the coin path or channel 39 and into a hopper assembly (not shown). If the installer is satisfied that the unit 10 is working properly, he or she can then reinstall the pay station upper housing.

Figure 1:
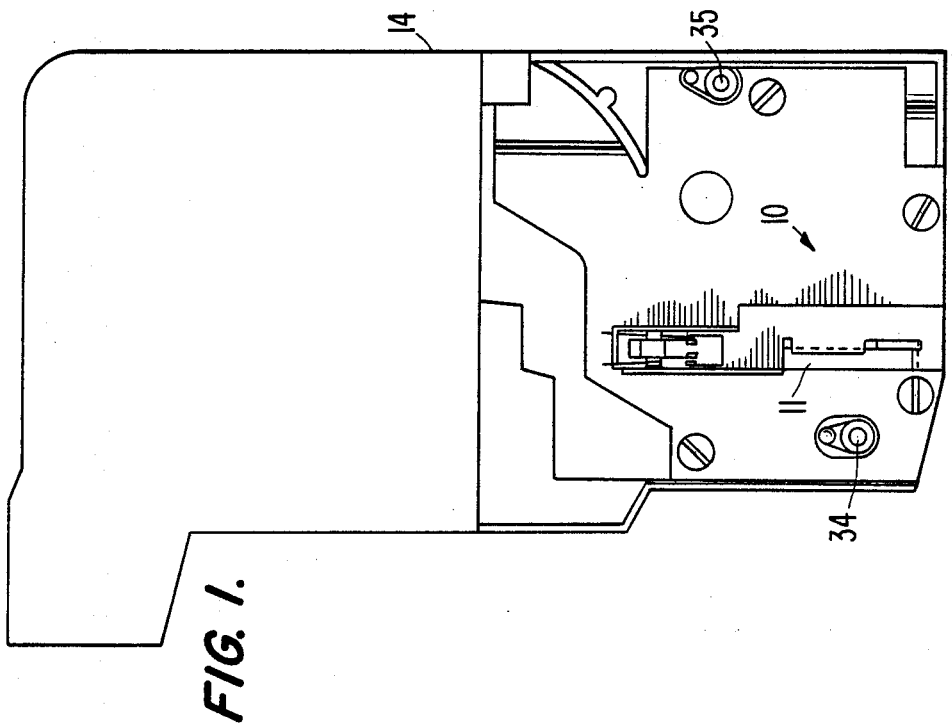
FIG. 1 is a side view showing details of the lower portion of a pay telephone station coin chute with an installed coin fraud preventor in accordance with the present invention.

With the coin fraud preventor unit 10 installed as shown in FIG. 1 in the area immediately downstream of the coin path 39, the coin 41 on the thread 42 shown in FIG. 2 is able to push the chamfered face 25 of the tooth 24 of the pawl 23 out of the way by virtue of the weight of the coin 41 acting against the light spring bias of the torsion spring 26 as shown in FIG. 6. When the coin 41 has passed the tooth 24 of the pawl 23, as shown in FIG. 5, the spring biases the pawl 23 clockwise so that the bottom surface of the tooth 24 prevents the coin 41 from being withdrawn upwardly along the coin path 39 by use of the thread 42. It will be appreciated that as further force is expended in pulling the thread upwardly to withdraw the coin 41, the pawl 23 will simply be biased further in the clockwise direction as shown in FIG. 5 to preclude any possibility of oscillating the coin 41 in a manner sufficient to trip circuitry which registers the number of deposited coins.

As shown in FIGS. 4 and 5, the tab 18 is located in the slot 11 to the right of fingers $F_1$ and $F_2$ and adjacent to finger $F_3$, which fingers contain piezoelectric coin sensors in a known manner. Finger $F_1$ detects nickels, finger $F_2$ detects dimes and finger $F_3$ detects quarters when the coins strike the slanted tops of the fingers or strike the sides of the fingers. The tab 18 prevents a coin from being oscillated to strike the side of the quarter finger $F_3$ to trip the coin counting circuitry, whereas the pawl 23 prevents the coin from being oscillated to strike the tops of the finger.

Another significant problem encountered with pay telephone stations is the installation and repair of handsets which are held to the telephone station upper housing by a lanyard and armor. Handsets typically represent the highest repair item in pay telephone stations because they are intentionally and unintentionally mishandled during normal use and are sometimes subject to vandalism. In order to provide a sufficient connection between the handset and the telephone housing, it is desired that the connection between the two be able to withstand tensile loads of at least 800 pounds to prevent either the handset being yanked from the upper housing or the flexible metal armor from unraveling and exposing sharp edges which can harm the user. It is also important that the connection between the handset and the housing provide for easy installation. The arrangement shown in FIGS. 7 and 9–11 accomplishes these goals.

Figures 7, 7A, 8:
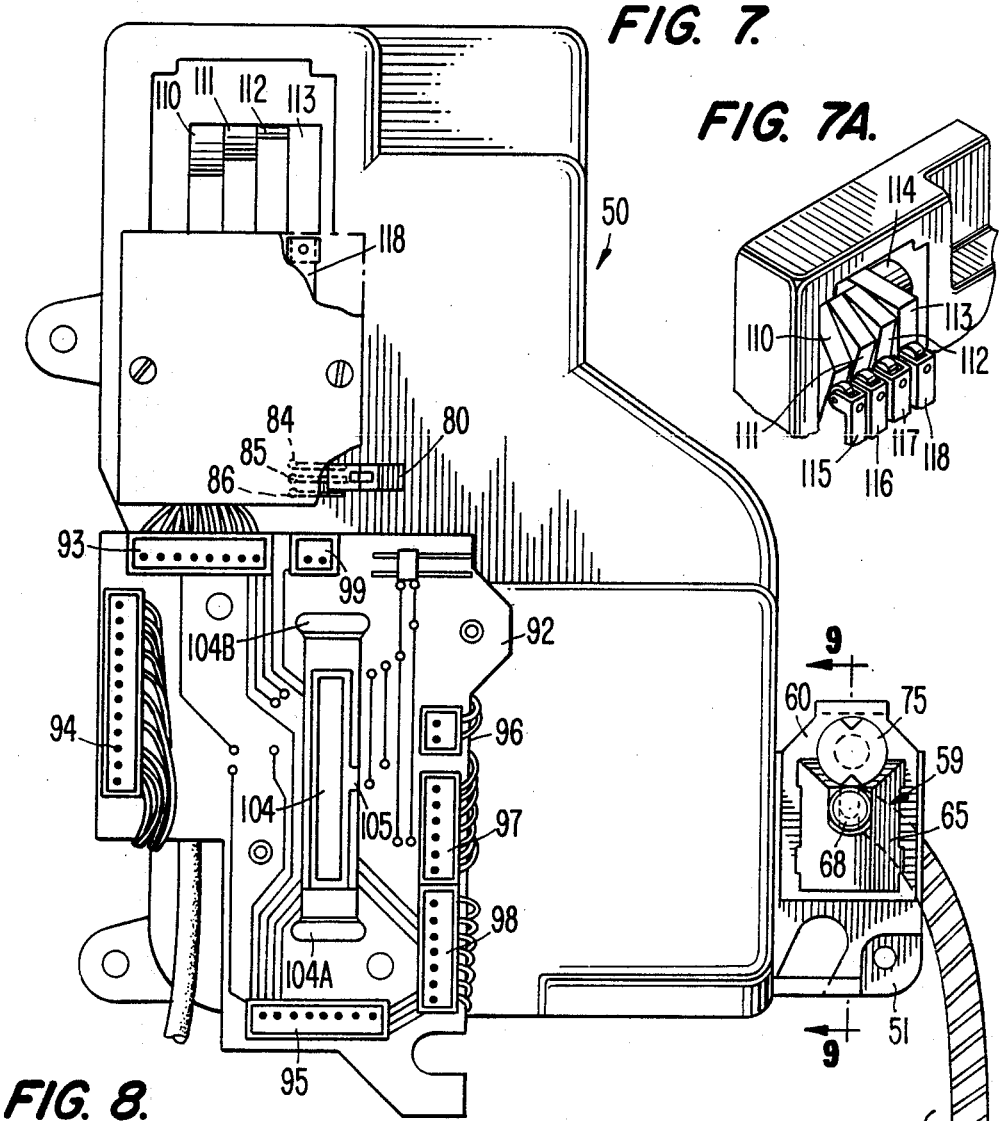
FIG. 7 is an elevational view of the coin dial unit of a pay telephone station partially broken away and showing details of a handset cord assembly anchor, a hook switch shorting jumper or connector, and a configuration circuit board and module receptacle in accordance with the present invention.
FIG. 7A is a perspective view of a broken-away portion of the hook switch permanent or fixed camming arrangement shown in FIG. 7 and showing the arrangement of rotatable cams with switch actuator arms biased thereagainst.
FIG. 8 is a perspective view of the hook switch shorting connector shown in FIG. 7.

In particular, FIG. 7 shows the anchor 59, lanyard 67 and armor 55 installed in the coin dial unit 50 of a pay telephone station upper housing (not shown) in accordance with the present invention. The coin dial unit 50 of the pay station is provided with an integral projecting portion 51. The projection 51 is provided with a recessed area 52 (FIG. 11) in which an upper threaded hole 53 and a lower through hole 54 are provided. The lower through hole 54 is of larger diameter than the threaded hole 53 and permits passage of the handset cord assembly A consisting of the armor 55 with electrical wires 57 and the lanyard 67 carried therein. In the event that the coin dial unit 50 and projection 51 are made of a plastic, a threaded metal bushing 58 is provided in the upper hole 53 to reinforce the plastic.

Figure 10:
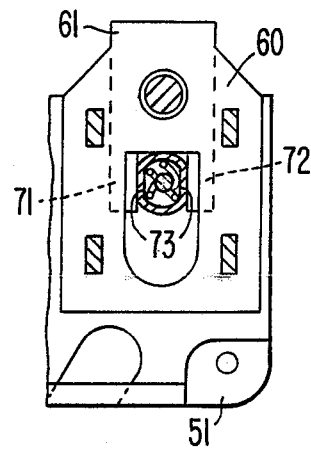
FIG. 10 is a view of the anchor taken along line 10—10 in FIG. 9.
Figure 11:
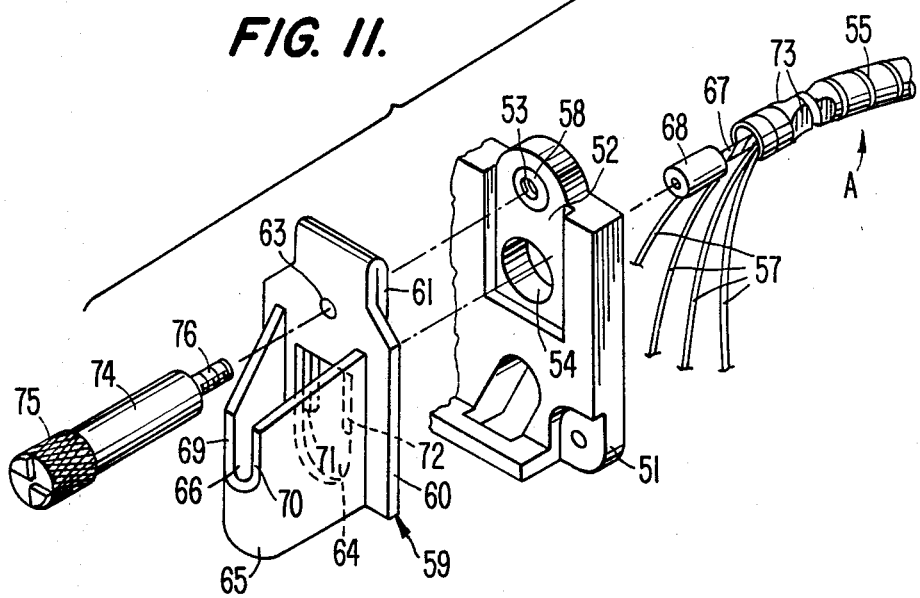
FIG. 11 is an exploded view of the anchor shown in FIGS. 9 and 10.

The anchor 59 can be made of a sufficiently strong metal and is provided with a base 60 having a bent-over portion 61 which is designed to seat in the recessed portion 52 of the projection 51 on the unit 50 to provide for easy and firm location of the anchor 59 on the projection 51. The anchor 59 is also provided with two apertures 63, 64 which align with the holes 53, 54, respectively, in the projection 51 on the unit 50. As seen in FIG. 10 the integral bent-over flange 61 on the anchor 59 reduces the area of the elongated aperture 64 with side projecting portions 71, 72 to receive and form lockingly hold flattened portions 73 near the end of the armor 55 upon installation as will be hereinafter explained. It is within the scope of the present invention to provide a grounding tab between the base 60 and the bent-over portion 61 in installations in which the projection 51 is made of plastic.

The anchor 59 is also provided with a rearwardly extending V-shaped body 65 which is firmly joined to the anchor base 60. The rear end of the body 65 is provided with an elongated notch 66 which is sized to receive a lanyard 67 having a cylindrical metal button 68 firmly fixed at the end thereof. The end face of the button 68 abuts surfaces 69, 70 of the notch 66 when the handset 56 is pulled away from the station. A long thumbscrew 74 having a textured end portion 75 for better gripping has a reduced threaded end 76 which is sized to pass through hole 63 in the base 60 and be threadably engaged in bushing 58 in the hole 53 of the projection 51. The body 65 is sized sufficiently to permit the wires 57 to be pulled through the bottom of the base and to pass the button 68 therethrough where it can abut the surfaces 69, 70 defining the notch 66.

Figure 9:
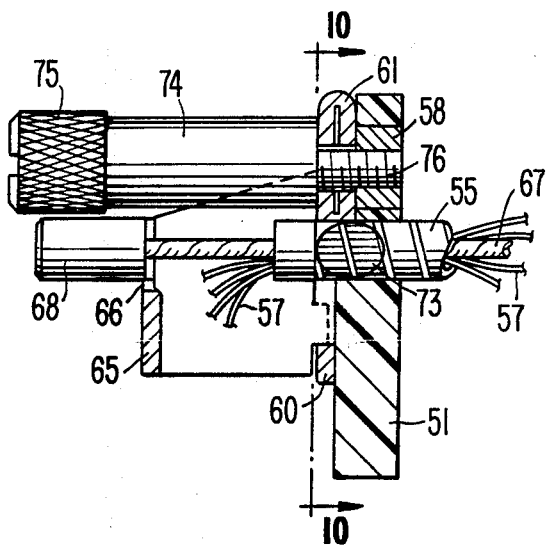
FIG. 9 is a partial cross-sectional side view of the anchor taken along line 9—9 in FIG. 7.

The handset cord assembly A is passed through the aperture 54 in the projection 51 on the housing 50, then through the lower aperture 64 in the base 60 of the anchor 59. The electrical wires 57 of the assembly A are then pulled out through the bottom of the V-shaped body 65. The lanyard 67 with button 68 is then pulled past the notch 66 in the body 65 so that the button 68 is outside the body 65 and the lanyard 67 rides in the notch 66 as shown in FIG. 9. The flattened portions 73 on the armor 55 are then moved under the projecting portions 71 and 72 which are spaced to receive the flattened portions 73 snugly. The armor 55 is pushed upwardly to place the flattened portions 73 between the portions 71 and 72 to restrain the armor from rotational and longitudinal movement. Longitudinal movement is precluded by the armor 55 on either end of the flattened portions 73 due to the diameter of the circular armor 55 which is larger than the distance between projecting portions 71, 72. The anchor 59 is then positioned in the recess 52 of the projection 51 by means of the bent-over flange 61 which lines up the anchor holes 63, 64 with the holes 53, 54 in the projection 51. The thumbscrew 74 is then screwed through the hole 63 in the anchor 59 and into the bushing 58 in the projection 51 as shown in FIG. 9.

Due to the V-shape of the body 65, any tensile force exerted on the lanyard 67 is distributed to the base to permit the anchor 59 to withstand loads in excess of 800 lbs. without deformation. The long thumbscrew 74 becomes an integral part of the anchor 59 while allowing for quick and toolless installation of the cord assembly A, and acts to retain button 68.

Figure 15A:
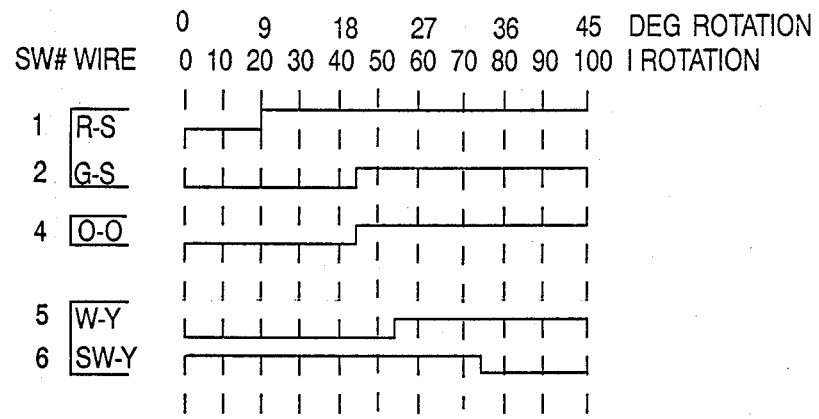
FIGS. 15A and 15B are timing diagrams showing respectively a conventional black slide timing using interchangeable timing slides in a hook switch assembly and the permanent camming arrangement shown in FIG. 7A with the shorting jumper in accordance with the present invention as shown in FIGS. 7 and 8.
Figure 15B:
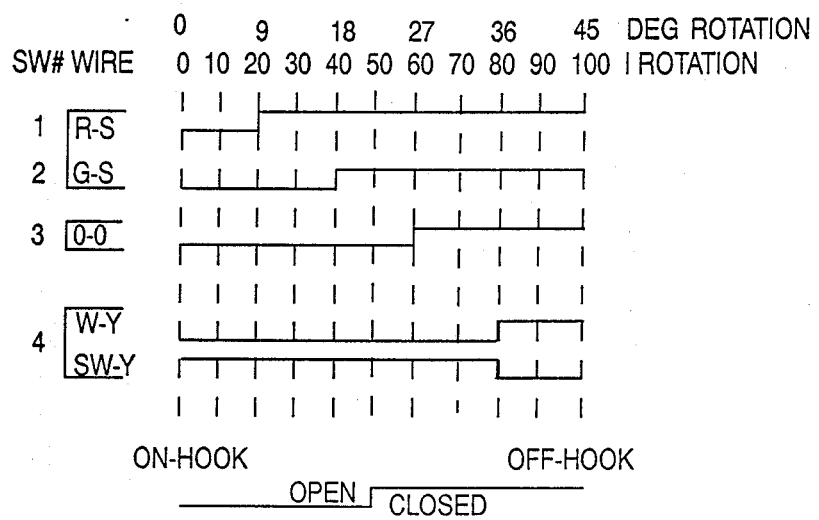
Figure 15C:
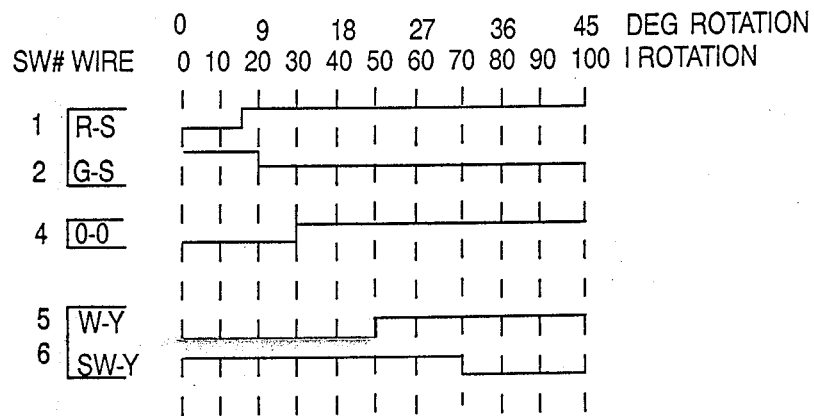
FIGS. 15C and 15D are timing diagrams similar to FIGS. 15A and 15B but showing respectively conventional white slide timing and its equivalent which is carried out in accordance with the present invention.

As also previously noted, pay telephone sets are provided with a hook switch assembly which contains multiple switches which, by means of various methods, can be caused to operate in various sequences. Typically, in order to change the configurations of the hook switch circuit, it has been necessary to change a timing slide between the hook switch lever and a cam-operated switching mechanism. Two types of slides in common use, a black slide and a white slid, provide specific timing configurations for the opening and closing of switches as shown in FIG. 15A depicting opening and closing of the switches in black slide timing and in FIG. 15C depicting opening and closing of the switches in white slide timing in terms of both degrees of rotation of the hook switch lever and the percentage of rotation between the on-hook and off-hook conditions. Five switches are required and utilize the R-S (red-slate) wires, the G-S (green-slate) wires, the O-O (orange-orange) wires, the W-Y (white-yellow) wires and the SW-Y (slate/white-yellow) wires. In addition to requiring an inventory of additional slide parts, the change-over is needlessly time consuming and hazardous to the electrical contacts. The actual details of the switches and their various purposes are well known and do not form the subject of the present invention.

Figure 15D:
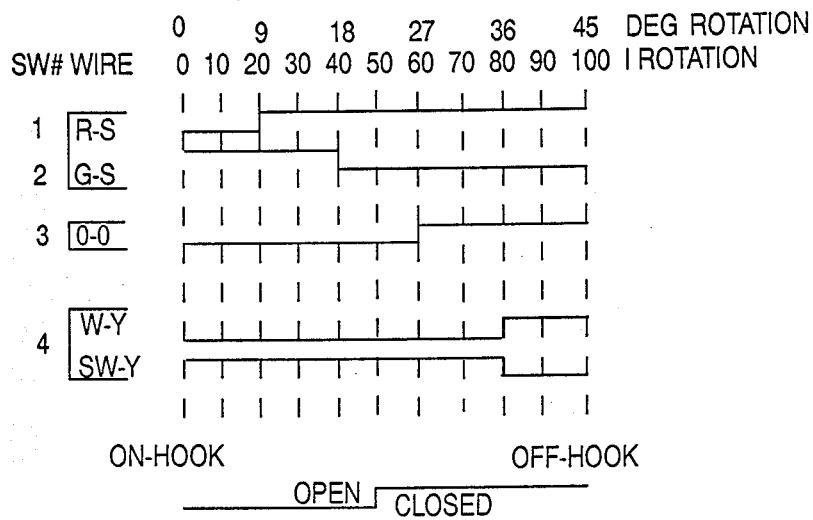

However, I have found a simple, inexpensive and effective way to avoid the need for changing the timing slide between the hook switch lever and the camming switch (or, in other words, to permit a permanent camming connection) and to provide new prewired switching configurations, for example, "C" and "D" set configurations in the switch assembly by means of the shorting jumper or connector 80 shown in FIG. 8 used with the permanent camming arrangement and switches shown in FIG. 7A. The hook switch assembly shown in FIGS. 7 and 7A comprises four cams 110, 111, 112, 113 fixed to a shaft 114 which is rotated by a conventional hook switch lever (not shown). The cams are offset on the shaft 114 in order to provide desired timing for actuating four switches S1, S2, S3, S4 (FIG. 16) through respective arms 115, 11, 117, 118 which are resiliently biased to maintain contact with the cam surfaces and snap the switches open and closed as the cams move through an angle of rotation of the shaft 114 (FIGS. 15B and 15D).

The terminal connecting portion 81 of the shorting jumper 80 comprises two female receptacles 82, 83 which permit the connector to be fitted on the ends of ale connectors 84, 85 in the hook switch circuit 87 shown in FIG. 7 effecting one type of connection or on male connectors 85, 86 in the hook switch circuit 87 effecting another type of connection in accordance with standard telephone hook switch configurations without the need to change the camming arrangement itself. A schematic of the hook switch circuit configuration according to the present invention is shown in FIG. 16 wherein only four switches are necessary, when used with the shorting jumper 80 to effect the appropriate interconnections among the eight color-designated wires in accordance with the timing sequence for closing the switches shown in FIGS. 15B and 15D. By utilizing the foregoing in connection with the fixed or permanent camming arrangement shown in FIG. 7A, it is now possible to obtain the functional equivalent of black slide timing (FIG. 15B) and white slide timing (FIG. 15D) with four switches and without the need for changing the camming arrangement by using changeable timing slides or program cards. In other words, multiple circuit configurations can now be obtained with a fixed or permanent camming mechanism which does not require interchangeable timing slides or other removable devices.

Figure 14:
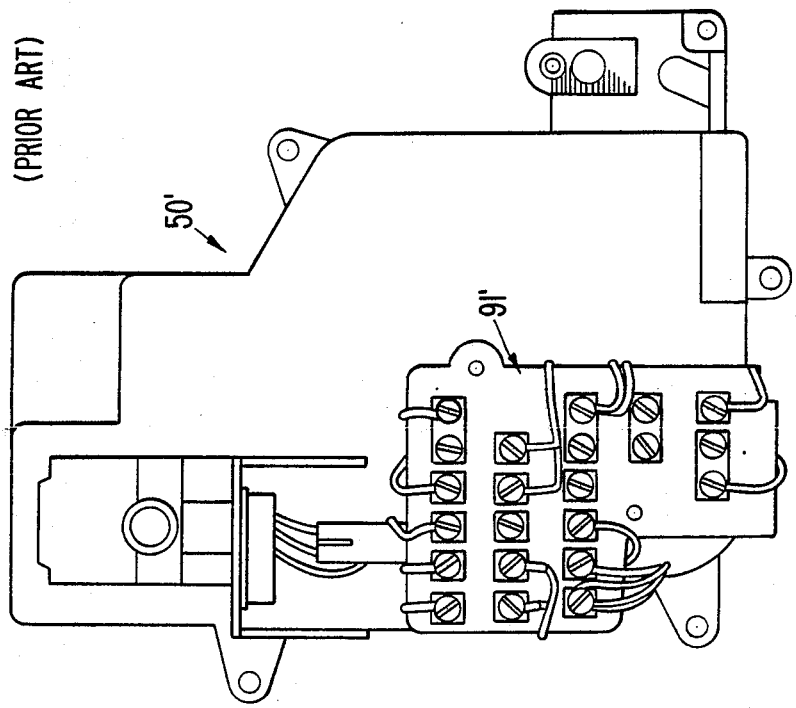
FIG. 14 is an elevational view of a conventional pay telephone coin dial unit wiring board with spaded wire terminals and screws.
Figure 13:
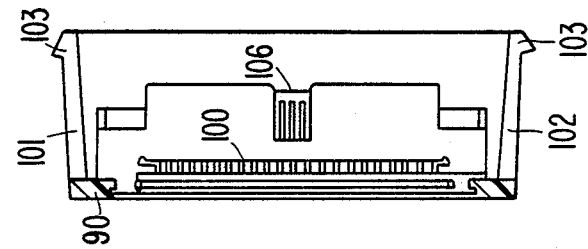
FIG. 13 is a side cross-sectional view of the configuration module taken along line 13—13 of FIG. 12.
Figure 12:
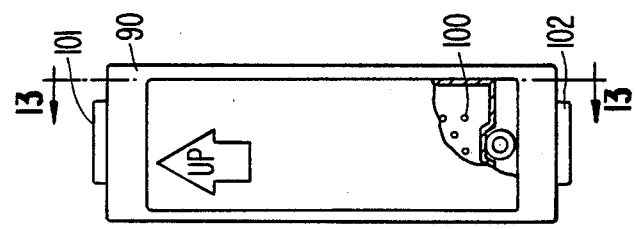
FIG. 12 is a plan view of the configuration module used in conjunction with the module receptacle shown in FIG. 7.

To further simplify changing functions in the pay station, configuration modules 90 of the type shown in FIGS. 12 and 13 can be provided. In conventional coin dial stations, as shown in FIG. 14, connections for configurations known in the industry as "C/CF", "C/DTF", "C/DTF-PG", and "D" had to be made and remade laboriously through the use of the spaded wire terminals and screws designated generally by the numeral 91 in which each wire connection had to be changed individually. Mistakes could easily be made in addition to the time needed to make the connections.

To avoid this problem, the present invention uses a configuration module 90 which can be simply and easily plugged into a centralized receptacle 104 (FIG. 7) on the printed circuit board 92 to obtain the different kinds of configurations without the need for individually relocating wires. As can be seen in FIG. 7, various areas on the real estate of the board 92 can be made modular. For instance, the connections from the hook switch to the board 92 can be provided in a modular member 93 which snaps into a mating receptacle permanently mounted on the board 92. Other modules such as a chassis module 94, an option module 95, dial modules 96, 97, 98 and a mercury switch module 99 can also be provided to effect known configurations on the printed circuit board 92.

To make the appropriate and desired connections among the various aforementioned modules on the board 92, a specific configuration module 90 with defined pin connections 100 (FIG. 13) can be provided. The module 90 is provided with flexible or resilient legs 101, 102 which are designed to latch in apertures 104A, 104B provided above and below the centralized receptacle 104 of the board 92 to hold the module 90 securely on the board by means of latching protrusions 103, 103' at the ends of he legs 101, 102 when the installer's fingers release pressure on the legs after pushing the module into place. The centralized receptacle 104 is provided with a portion 105 which mates with a keying notch 106 on the module 90 such that the configuration module 90 cannot be inserted into the central area receptacle 104 on the board 92 unless the module is properly oriented. The shorting connector 80 can also be changed from one set of wires 84, 85 to the other set of wires 85, 86 in conjunction with the selection of a configuration module 90.

Option connector 95 is unique in the fact that other options (e.g. handset volume amplifiers), if properly preconfigured, can be added in the field simply by inserting the optional circuit into option connector 95 on configuration board 92 and changing to a separate configuration module 90 that will wire the options into the pay station appropriately.

While we have shown one embodiment of each of the aspects in accordance with the present invention, it is to be understood that the same is susceptible of numerous changes and modifications as will be apparent to one skilled in the art given the foregoing description. Therefore, we do not intend to be limited to the details shown and described herein but intend to cover all such changes and modifications as are encompassed by the scope of the appended claims.

We claim:

1. A pay telephone station, comprising lower housing coin chute assembly, an upper housing coin dial unit, means operatively associated with the coin chute assembly for preventing coin fraud, means operatively associated with the coin dial unit for connecting a handset and handset cord assembly comprising a lanyard, armor and electrical wiring to the coin dial unit, a shorting connector for selectively changing a hook switch configuration in the coin dial unit, and a configuration module for effecting rapid electrical connection among two or more circuits in the coin dial unit.

2. A pay telephone station according to claim 1, wherein the coin fraud preventing means comprises a relatively thin base having a pawl pivotally arranged thereon, the pawl having a tooth biased through an aperture in the base, and the base being sized to fit in a slot in a coin channel cover plate in the lower housing coin chute.

3. A pay telephone station according to claim 2, wherein the base includes at least one projecting flange for locating the coin fraud prevention means in the slot.

4. A pay telephone station according to claim 2, wherein a torsion spring is operatively arranged between the base and the pawl to bias the tooth.

5. A pay telephone station according to claim 2, wherein the tooth of the pawl is in the path of a coin passing through a coin channel in the coin chute.

6. A pay telephone station according to claim 5, wherein the base includes at least one projecting flange for locating the coin fraud prevention means in the slot.

7. A pay telephone station according to claim 6, wherein a torsion spring is operatively arranged between the base and the pawl to bias the tooth.

8. A pay telephone station according to claim 2, wherein the base includes a projecting flange positioned adjacent coin sensors arranged in a coin path of the coin chute assembly.

9. A pay telephone station according to claim 1, wherein the connecting means comprises a projection integrally associated with the upper housing coin dial unit, the projection being provided with a first aperture for passage of the handset cord assembly and with a threaded second aperture, a rigid anchor member having a base with first and second apertures aligned with the first and second apertures respectively in the projection, and a V-shaped body extending from the anchor base with means for securely holding the lanyard, and means for securely joining the anchor member with the projection through the threaded second hole in the projection and the second hole in the anchor base.

10. A pay telephone station according to claim 9, wherein the lanyard is provided with a button at the free end thereof, and the V-shaped body is notched to receive the lanyard therein with the button abutting the V-shaped body.

11. A pay telephone station according to claim 9, wherein the anchor member has a bent-over portion which extends partially over the first aperture of the anchor member to define a reduced aperture with straight sides, and the armor is provided with a portion which mates with the reduced aperture to provide a formlocking connection between the anchor member and the armor.

12. A pay telephone station according to claim 9, wherein the joining means is an elongated body having a threaded portion engaging a mating threaded portion in the threaded second aperture in the projection.

13. A pay telephone station according to claim 12 wherein the lanyard is provided with a button at the free end thereof, and the V-shaped body is notched to receive the lanyard therein with the button abutting the V-shaped body.

14. A pay telephone station according to claim 13, wherein the elongated body is adjacent the button in such a manner as to maintain the lanyard securely in the notch.

15. A pay telephone station according to claim 14, wherein the anchor member has a bent-over portion which extends partially over the first aperture of the anchor member to define a reduced aperture with straight sides, and the armor is provided with a portion which mates with the reduced aperture to provide a form-locking connection between the anchor member and the armor.

16. A pay telephone station according to claim 1, wherein the upper housing coin dial unit includes a hook switch circuit, and means for selectively providing an interconnection of three wires of the hook switch circuit.

17. A pay telephone station according to claim 16, wherein a hook switch lever operatively arranged on the coin dial unit is associated with the hook switch circuit via a permanent camming arrangement.

18. A pay telephone station according to claim 1, wherein the upper housing coin dial unit is provided with a printed circuit board for connection of various circuits in the station, and the configuration module is removably associated with the board for providing the connection of the various circuits to obtain a desired configuration.

19. A pay telephone station according to claim 18, wherein the configuration module comprises a body with legs adapted to engage corresponding apertures in the board and with pin connections arranged electrically to contact selected circuits on the printed circuit board and thereby provide the connection for the desired configuration.

20. A pay telephone according to claim 19 wherein a mating notch and a projecting portion are provided respectively on the configuration module and the board such that the configuration module can only be attached to the printed circuit board in one orientation to assure a proper circuit configuration.

21. A coin fraud preventing device for use in a pay telephone station, comprising a relatively thin base having a pawl pivotally arranged thereon, the pawl having a tooth biased through an aperture in the base, and the base being sized to fit in a coin channel cover plate slot in the pay telephone station.

22. A coin fraud preventing device according to claim 21, wherein the base includes at least one projecting flange for locating the device in the slot.

23. A coin fraud preventing device according to claim 21, wherein a torsion spring is operatively arranged between the base and the pawl to bias the tooth.

24. A coin fraud preventing device according to claim 21, wherein the tooth of the pawl is in a path of a coin passing through a coin channel in the station.

25. A coin fraud preventing unit according to claim 21, wherein the base includes a projecting flange arranged to be adjacent coin sensors arranged in a coin path of the coin chute.

26. A coin fraud preventing device according to claim 24, wherein the base includes at least one projecting flange for locating the device in the slot.

27. A coin fraud preventing device according to claim 26, wherein a torsion spring is operatively arranged between the base and the pawl to bias the tooth.

28. A device for anchoring a handset to a telephone station through a handset cord assembly which includes a lanyard, electric wires and an armor, comprising a projection integrally associated with the station, the projection being provided with a first aperture for passage of the handset cord assembly and with a second threaded aperture, a rigid anchor member having a base with first and second apertures aligned with the first and second apertures respectively in the projection, and a V-shaped body extending from the anchor base with means for securely holding the lanyard, and means for securely joining the anchor member with the projection through the threaded second hole in the projection and second hole in the anchor base.

29. A device for anchoring a handset to a telephone station according to claim 28, wherein the lanyard is provided with a button at the free end thereof, and the V-shaped body is notched to receive the lanyard therein with the button abutting the V-shaped body.

30. A device for anchoring a handset to a telephone station according to claim 28, wherein the anchor member has a bent-over portion which extends partially over the first aperture of the anchor member to define a reduced aperture with straight sides, and the armor is provided with a portion which mates with the reduced aperture to provide a form-locking connection between the anchor member and the armor.

31. A device for anchoring a handset to a telephone station according to claim 28, wherein the joining means is an elongated body having a threaded portion engaging a mating threaded portion in the second threaded aperture in the projection.

32. A device for anchoring a handset to a telephone station according to claim 31, wherein the lanyard is provided with a button at the free end thereof, and the V-shaped body is notched to receive the lanyard therein with the button abutting the V-shaped body.

33. A device for anchoring a handset to a telephone station according to claim 32, wherein the elongated body is adjacent the button in such a manner as to maintain the lanyard securely in the notch.

34. A device for anchoring a handset to a telephone station according to claim 33, wherein the anchor member has a bent-over portion which extends partially over the first aperture of the anchor member to define a reduced aperture with straight sides, and the armor is provided with a portion which mates with the reduced aperture to provide a form-locking connection between the anchor member and the armor.

35. A hook switch circuit connector for use in an upper housing coin dial unit of a pay telephone station in which a hook switch lever is operatively associated with a hook switch circuit via a permanent camming arrangement, comprising a member providing a selective slide connection between two of three wires of the hook switch circuit to obtain multiple hook switch circuit configurations.

36. A configuration module for use in telephone stations having a central printed circuit board for connection of various circuits of the station, comprising a body removably associated with the board for providing the connection of the various circuits to obtain a desired configuration, legs associated with the body and adapted to engage corresponding apertures in the board, and pin connections in the body arranged to electrically contact selected wires on the printed circuit board and thereby to provide the connection for the desired configuration.

37. A configuration module according to claim 36, wherein a mating notch and a projecting portion are provided respectively on the configuration module and the board such that the configuration module can only be attached to the circuit board in one orientation to assure a proper circuit configuration.

38. A pay telephone station, comprising a coin dial unit having a central printed circuit board, a plurality of modules electrically connected with circuits of the station, receptacles on the board for rapidly connecting the modules, and a configuration module configured to engage with the board and having pin connections arranged selectively to electrically connect the plurality of modules and obtain a desired configuration.

39. A pay telephone station according to claim 38, wherein the configuration module comprises a body removably associated with the board for providing the connection of the various circuits to obtain a desired configuration, legs associated with the body and adapted to engage corresponding apertures in the board, and pin connections in the body arranged to electrically contact selected wires on the printed circuit board and thereby to provide the connection for the desired configuration.

40. A pay telephone station according to claim 39, wherein a mating notch and a projecting portion are provided respectively on the configuration module and the board such that the configuration module can only be attached to the circuit board in one orientation to assure a proper circuit configuration.

41. A pay telephone station according to claim 40, wherein each of the plurality of modules includes means for effecting a latching connection with the respective receptacle.

* * * * *